United States Patent
Yang

(10) Patent No.: US 11,226,515 B2
(45) Date of Patent: Jan. 18, 2022

(54) DISPLAY PANEL AND DISPLAY DEVICE

(71) Applicant: WUHAN CHINA STAR OPTOELECTRONICS TECHNOLOGY CO., LTD, Hubei (CN)

(72) Inventor: Yong Yang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/652,429

(22) PCT Filed: Nov. 14, 2019

(86) PCT No.: PCT/CN2019/118450
§ 371 (c)(1),
(2) Date: Mar. 31, 2020

(87) PCT Pub. No.: WO2021/077497
PCT Pub. Date: Apr. 29, 2021

(65) Prior Publication Data
US 2021/0116755 A1   Apr. 22, 2021

(30) Foreign Application Priority Data
Oct. 21, 2019  (CN) .......................... 201911002735.7

(51) Int. Cl.
*G02F 1/13357* (2006.01)
*G02F 1/1335* (2006.01)

(52) U.S. Cl.
CPC .. *G02F 1/133606* (2013.01); *G02F 1/133603* (2013.01); *G02F 1/133607* (2021.01)

(58) Field of Classification Search
None
See application file for complete search history.

(56) References Cited

U.S. PATENT DOCUMENTS

| 5,754,268 A * | 5/1998 | Aihara | G03B 17/20 349/155 |
|---|---|---|---|
| 10,768,356 B1 | 9/2020 | Zhang et al. | |
| 2007/0058395 A1 * | 3/2007 | Fang | G02B 6/0043 362/615 |

(Continued)

FOREIGN PATENT DOCUMENTS

| CN | 110010666 A | 7/2019 |
|---|---|---|
| CN | 110161749 A | 8/2019 |

(Continued)

*Primary Examiner* — Edward J Glick
*Assistant Examiner* — David Y Chung
(74) *Attorney, Agent, or Firm* — Mark M. Friedman

(57) ABSTRACT

A display panel and a display device are provided by this disclosure. The display panel comprises an imaging area and a main display area surrounding the imaging area, wherein the imaging area comprises a LED lamp plate, a light controlling layer disposed on the LED lamp plate, a diffusion layer disposed on the LED lamp plate, a liquid crystal structural layer disposed on the light controlling layer, and a groove extending from the LED lamp plate to a surface of the liquid crystal structural layer close to the diffusion layer.

14 Claims, 4 Drawing Sheets

(56) References Cited

U.S. PATENT DOCUMENTS

| | | | | |
|---|---|---|---|---|
| 2011/0013119 A1* | 1/2011 | Ha | ................... | G02F 1/133611 |
| | | | | 349/64 |
| 2011/0299013 A1* | 12/2011 | Ishida | .................. | G02B 6/0038 |
| | | | | 349/65 |
| 2012/0188792 A1* | 7/2012 | Matsumoto | .......... | G02B 6/0036 |
| | | | | 362/613 |
| 2016/0161664 A1* | 6/2016 | Ishida | ....................... | G02B 6/00 |
| | | | | 359/230 |
| 2019/0243187 A1* | 8/2019 | Liu | ................... | G02F 1/133603 |
| 2020/0257044 A1* | 8/2020 | Rinko | .................. | G02B 6/0065 |

FOREIGN PATENT DOCUMENTS

| | | | |
|---|---|---|---|
| CN | 110346970 A | 10/2019 | |
| CN | 209496219 U | 10/2019 | |
| GB | 2475519 A | 5/2011 | |

\* cited by examiner

DISPLAY PANEL AND DISPLAY DEVICE

BACKGROUND OF INVENTION

Field of Invention

This disclosure relates to the field of display technologies, and particularly relates to a display panel and a display device.

Description of Prior Art

With the continuous development and promotion of small-sized displaying technology of low temperature polysilicon (LTPS), full-screen smartphones have become mainstream in the market. Technologies such as full screens with a v-shaped notch, full screens with a waterdrop notch, and full screens with a hole punch notch evolving from the development of full screens emerge one after another. And a higher and higher screen-to-body ratio of mobile phones continuously optimizes the full screen technology. However, these three technologies all require holes punching or irregular-shaped cutouts in certain areas, and it also requires notches, where cameras are located to be exposed, for photographing. Thus, it is virtually impossible to fulfill a full screen display. Because of this, people also try to further improve the screen-to-body ratio by introducing imaging area for displaying, but there is no better solution on how to perfectly combining the camera photographing with the imaging area.

To solve the above technical problems, this disclosure provides a display panel and a display device to really fulfill a full screen display, which cannot be achieved in prior art due to the requirement of ensuring the amount of incoming light entering camera areas.

SUMMARY OF INVENTION

A technical scheme to solve the above problems is to provide a display panel by this disclosure which comprises an imaging area and a main display area surrounding the imaging area, wherein the imaging area comprises a LED lamp plate, a light controlling layer disposed on the LED lamp plate, a diffusion layer disposed on a side of the light controlling layer away from the LED lamp plate, a liquid crystal structural layer disposed on a side of the diffusion layer away from the light controlling layer, and a groove extending from the LED lamp plate to a surface of the liquid crystal structural layer close to the diffusion layer.

Furthermore, the light controlling layer comprises a body film layer having a first surface and a second surface, wherein the first surface faces the diffusion layer, and the second surface faces the LED lamp plate, and a first refracting structure distributed on the first surface.

Furthermore, the light controlling layer further comprises a second refracting structure distributed on the second surface.

Furthermore, the first refracting structure comprises a first arc surface extending from the first surface to a direction of the diffusion layer and the groove; and a first vertical surface connecting the first arc surface to the first surface.

Furthermore, the second refracting structure comprises a second arc surface extending from the second surface to a direction of the LED lamp plate and the groove; and a second vertical surface connecting the second arc surface to the second surface.

Furthermore, a space between adjacent first vertical surfaces is less than a space between adjacent second vertical surfaces.

Furthermore, a height of the first vertical surface is defined as H, a length of a projection line of the first arc surface on the first surface is defined as I, wherein a ratio of H and I is in a range of 0.01 to 0.15.

Furthermore, a material of the liquid crystal structural layer comprises polymers and small molecular liquid crystals.

Furthermore, a diameter of the groove is in a range of 2 mm to 5 mm.

A display device comprising the above display panels is provided by this disclosure.

According to the display panel and the display device of this disclosure, a groove is provided in the imaging area of the display panel to allow light to enter the camera through the groove so that the amount of incoming light which is needed for camera photographing can be ensured. Meanwhile, the LED lamp plates are configured above the camera and on two sides of the groove so that the imaging area can display images when the camera is turned off. At the same time, the light controlling layer is configured on the LED lamp plate. Light on both sides of the groove is refracted into the groove by the refracting structure which is mirror-symmetrical to the groove on the light controlling layer so that the display panel located above the groove can normally display images, when the camera is not in operation, to truly fulfill a full screen.

BRIEF DESCRIPTION OF DRAWINGS

In order to more clearly illustrate the technical solution of this disclosure, a brief description of the drawings that are necessary for the illustration of the embodiments will be given as follows. Obviously, the drawings described below show only some embodiments of this disclosure, and a person having ordinary skill in the art may also obtain other drawings based on the drawings described without making any creative effort.

In the figures, reference numbers are as the followings:
1 display device; 10 display panel;
101 imaging area; 110 LED lamp plate;
120 light controlling layer; 130 diffusion layer;
140 liquid crystal structural layer; 1011 groove;
111 substrate; 112 LED lamp bead;
121 body film layer; 1211 first surface;
1212 second surface; 122 first refracting structure;
11 camera; 123 second refracting structure;
1221 first refracting unit; 12211 first arc surface;
12212 first vertical surface; 1231 second refracting unit;
12311 second arc surface; 12312 second vertical surface;

DETAILED DESCRIPTION OF PREFERRED EMBODIMENTS

The description of following embodiment, with reference to the accompanying drawings, is used to exemplify specific embodiments which may be carried out in this disclosure. The directional terms mentioned in this disclosure, such as "up", "down", "front", "back", "left", "right", "top", "bottom", etc., only refer to the directions in attached drawings. Therefore, the directional terms are used to illustrate and help understand this disclosure, but not used to limit this disclosure.

The First Embodiment

Figure 1:
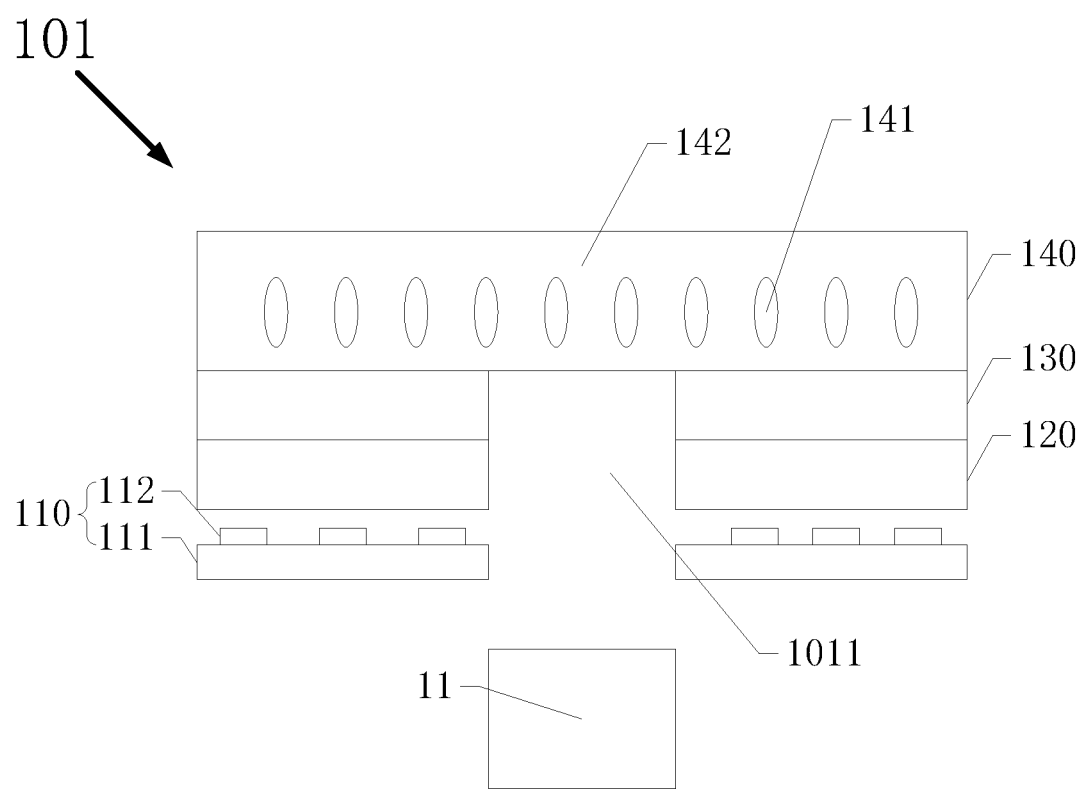
FIG. 1 is a partially schematic diagram of a display panel according to the first embodiment.
Figure 2:
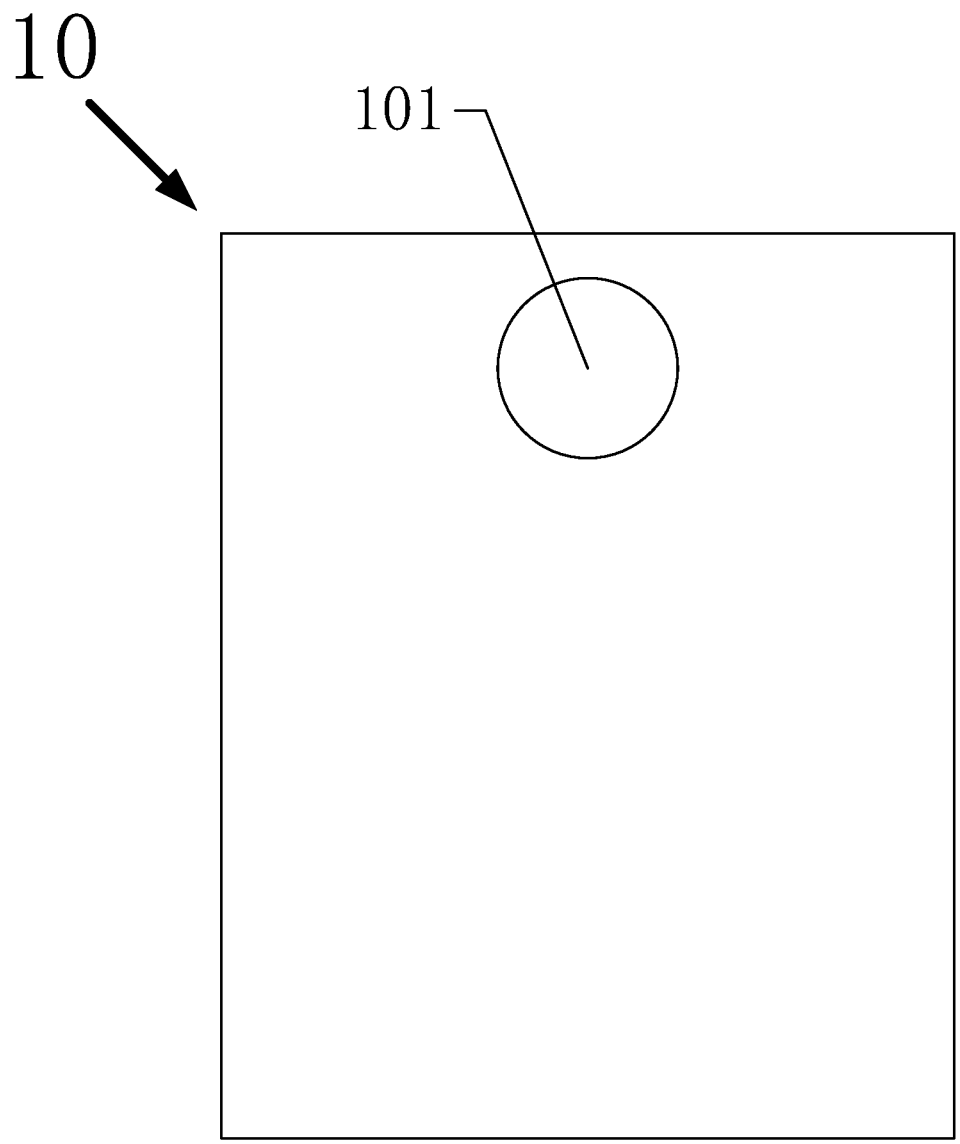
FIG. 2 is a schematic diagram of the display panel according to the first embodiment.

As shown in FIG. 1 and FIG. 2, a display panel 10 comprises an imaging area 101. The display panel 10 further comprises a LED lamp plate 110, a light controlling layer 120, a diffusion layer 130, and a liquid crystal structural layer 140.

The LED lamp plate 110 comprises a substrate 111 and a plurality of LED lamp beads 112. The LED lamp beads 112 are arranged in an array on the substrate 111. The LED lamp beads 112 can be single-color chips. Under this circumstance, the LED lamp plate 110 is a single-color light source. The LED lamp beads 112 also can be triple-color chips. Under this circumstance, the LED lamp plate 110 is a colorful light source.

When camera function or video function of the display panel 10 is turned on, the LED lamp beads 112 on the LED lamp plate 110 are turned off. When camera function or video function of the display panel 10 is turned off, the LED lamp beads 112 on the LED lamp plate 110 are turned on to allow the imaging area 101 to functionally display images so as to fulfill a full screen effect.

To make sure that the imaging area 101 can take pictures and shoot videos functionally, a groove 1011 is provided in the imaging area 101. An opening direction of the groove 1011 faces away from the liquid crystal structural layer 140 and penetrating the LED lamp plate 110, the light controlling layer 120, and the diffusion layer 130. A camera 11 is configured in the opening direction of the imaging area 101 that is somewhere under the LED lamp plate 110. External light enters the camera 11 through the groove 1011 and is used for picture taking or video shooting.

As the groove 1011 penetrates the LED lamp plate 110, when the camera 11 is not in operation, it is necessary for the imaging area 101 to display functionally. However, the LED lamp beads 112 are absent in the position of the groove 1011, so pictures cannot be functionally displayed. In this embodiment, the light controlling layer 120 is used to solve this problem.

Figure 3:
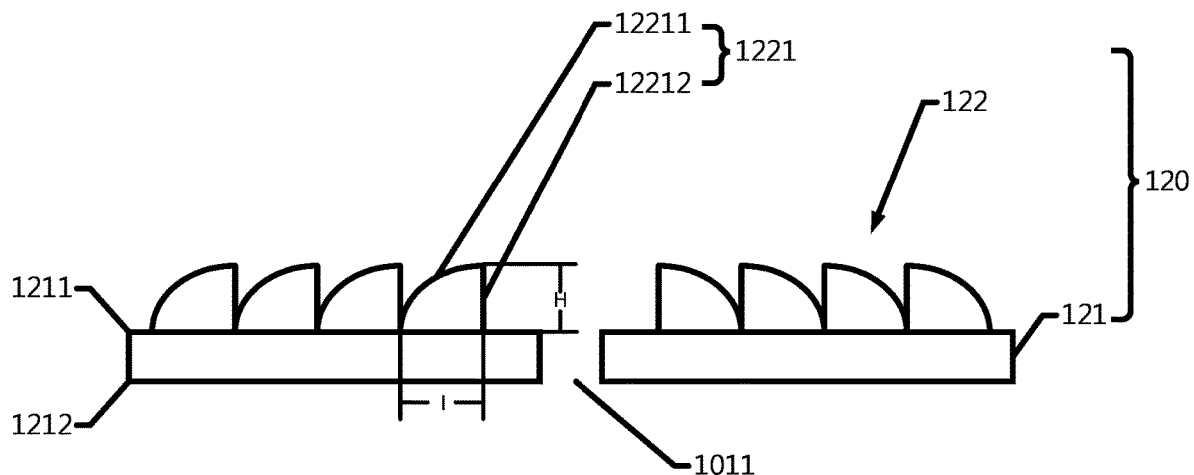
FIG. 3 is a schematic diagram of a light controlling layer according to the first embodiment.

As shown in FIG. 3, specifically, the light controlling layer 120 is disposed on the LED lamp plate 110, which comprises a body film layer 121 and a first refracting structure 122. The body film layer has a first surface 1211 facing the diffusion layer 130 and a second surface 1212 facing the LED lamp plate 110. Herein, the first refracting structure 122 is disposed on the first surface 1211.

The first refracting structure 122 is disposed on a side of the body film layer 121 away from the LED lamp plate 110. The first refracting structure 122 comprises a plurality of first refracting units 1221 arranged in an array. The first refracting unit 1221 comprises a first arc surface 12211 and a first vertical surface 12212.

The first arc surface 12211 extends from the first surface 1211 to a direction of the diffusion layer 130 and the groove 1011. Two ends of the first vertical surface 12212 connects to the first arc surface 12211 and the first surface 1211.

As the first arc surfaces 12211 face the groove 1011, when the camera 11 is in operation, the LED lamp beads on the LED lamp plate are turned on. Light from the LED lamp plate 110 enters the first refracting structure 122 through the body film layer 121. The light is refracted to a direction of the groove 1011 due to a radian of the first arc surface 12211, allowing the groove 1011 area to display images to fulfill the full screen effect.

A depth-to-width ratio is defined for the first refracting structure 122. A length of a first short side 122111 is defined as H, and a length of a projection straight line of a first arc long side 122112 on the body film layer 121 is defined as a I, wherein a ratio of the H and the I is a depth-to-width ratio in the embodiment, which is in a range of 0.01 to 0.15.

The diffusion layer 130 is disposed on the light controlling layer 120. The diffusion layer 130 is used to mix light. Light turns to be gentler after going through the light controlling layer 120 and then passing the diffusion layer 130. At the same time, the diffusion layer can shield a lamp shadow of the LED lamp plate 110, which improves display quality.

The liquid crystal structural layer 140 is disposed on the diffusion layer 130. The liquid crystal structural layer 140 comprises a plurality of liquid crystal molecules 141 and a liquid crystal cell 142 sealing the liquid crystal molecules. Herein, the liquid crystal molecules 141 are mainly consist of polymers and small molecular liquid crystals. When a voltage is applied to the liquid crystal structural layer 140, in a light vector direction, refractive indexes of the polymers and the small molecular liquid crystals are the same. The liquid crystal structural layer 140 renders transparent and ensures an amount of incoming light for camera photographing with a relatively high transparency. When no voltage is applied on the liquid crystal structural layer 140, in the light vector direction, refractive indexes of the polymers and the small molecular liquid crystals are different. The liquid crystal structural layer 140 is in a scattering state and functions to hide the camera 11.

When camera function or video function of the camera 11 is turned on, the LED lamp plates 110 are turned off. The above liquid crystal structural layer 140 is in a transparent state in the groove 1011 while it is in a scattering state in other positions. When the camera function of the camera 11 is turned off, the LED lamp plates 110 are turned on and light is modulated and emitted by the above liquid crystal structural layer 140 so as to fulfill a full screen effect.

The Second Embodiment

Figure 4:
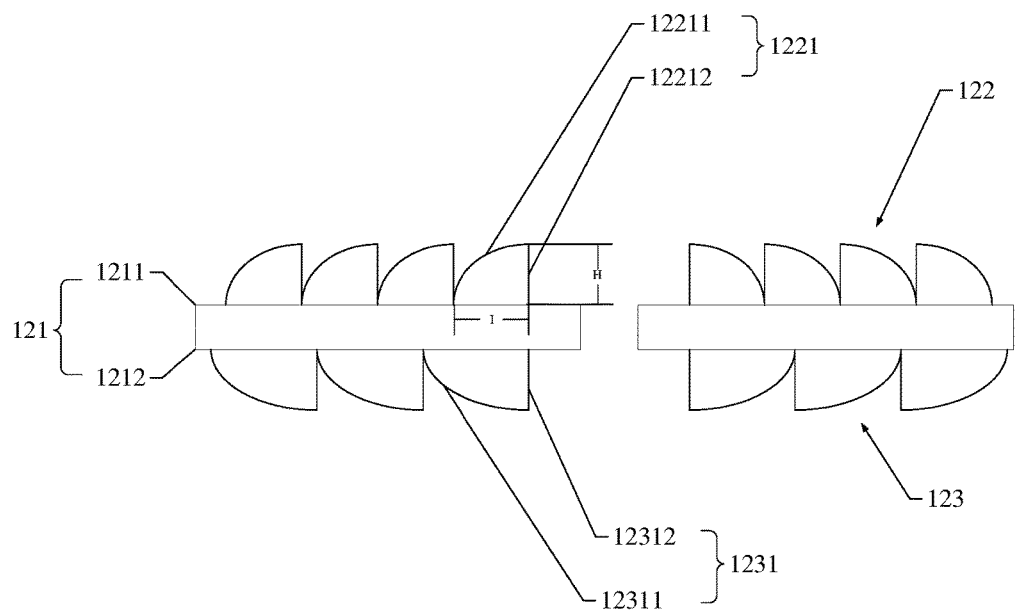
FIG. 4 is a schematic diagram of a light controlling layer according to the second embodiment.

In this embodiment, the display panel 20 of this disclosure is basically similar to that in the first embodiment, except that as shown in FIG. 4, the refracting structure 122 in the embodiment includes a first refracting structure 122 and a second refracting structure 123.

The first refracting structure 122 is disposed on a side of the body film layer 121 away from the LED lamp plate 110. The first refracting structure 122 comprises a plurality of first refracting units 1221 arrange in an array. The first refracting unit 1221 comprises a first arc surface 12211 and a first vertical surface 12212.

The first arc surface 12211 extends from the first surface 1211 to a direction of the diffusion layer 130 and the groove 1011. Two ends of the first vertical surface 12212 connects to the first arc surface 12211 and the first surface 1211.

The second refracting structure 123 is disposed on a second surface 1212 of the body film layer 121. Herein, the second refracting structure 123 comprises a plurality of second refracting units 1231 arranged in an array.

The second refracting unit 1231 comprises a second arc surface 12311 and a second vertical surface 12312.

The second arc surface 12311 extends from the second surface 1212 to a direction of the LED lamp plate 110 and the groove 1011. The second vertical surface 12312 connects the second arc surface 12311 to the second surface 1212.

When the camera 11 is not operating, the LED lamp beads on the LED lamp plate are turned on. As a direction of the second arc surfaces faces the groove 1011, after being refracted by the second refracting structure 123, vertical light emitted by the LED lamp plate 110 enters the first refracting structure 122 at an angle inclined to the groove 1011. The light after being refracted is again refracted by the first arc surface 12211 to a direction of the groove 1011 so as to allow the groove 1011 area to display images to fulfill the full screen effect.

A length of a first short side 122111 is defined as H, and a length of a projection straight line of a first arc long side 122112 on the body film layer 121 is defined as I, wherein a ratio of H and I is a depth-to-width ratio in the embodiment, which is in a range of 0.01 to 0.15. A depth-to-width ratio of the second refracting structure 123 can be adjusted according to the actual situation, which is generally greater than the depth-to-width ratio of the first refracting structure 122, so as to obtain light at different emitting angles and accomplish uniform light emission at the position of the groove 1011.

Figure 5:
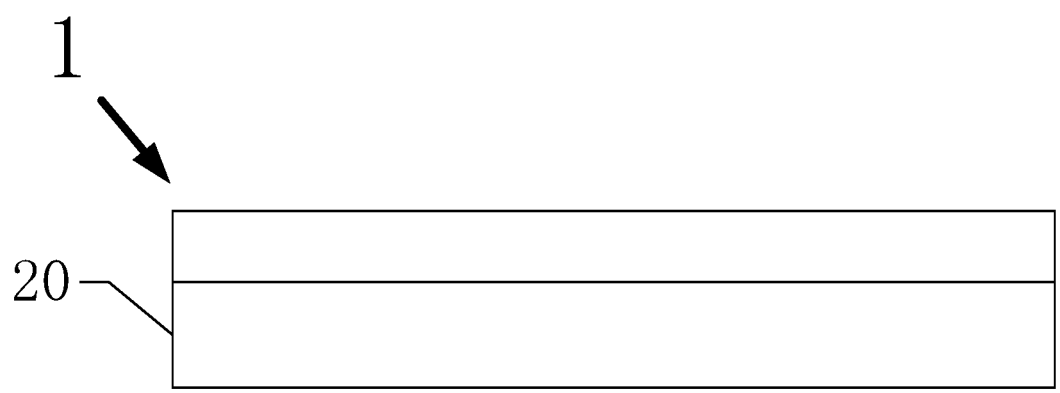
FIG. 5 is a schematic diagram of a display device according to the second embodiment.

As shown in FIG. 5, in this embodiment, a display device 1 of this disclosure comprises the display panel 20. The main technical features and main technical effects of the display device 1 are mainly embodied on the display panel 20, and other parts of the display device 1 will not be described in detail.

The above are only better embodiments of this disclosure and does not limit this disclosure. Any modification, equivalent replacement and improvement made within the spirit and principles of this disclosure should be included in the protection scope of this disclosure.

What is claimed is:

1. A display panel comprising an imaging area and a main display area surrounding the imaging area, wherein the imaging area comprises:
    an LED lamp plate;
    a light controlling layer disposed on the LED lamp plate;
    a diffusion layer disposed on a side of the light controlling layer away from the LED lamp plate;
    a liquid crystal structural layer disposed on a side of the diffusion layer away from the light controlling layer; and
    a groove extending from the LED lamp plate to a surface of the liquid crystal structural layer close to the diffusion layer;
    wherein the light controlling layer comprises:
    a body film layer having a first surface and a second surface, wherein the first surface faces the LED lamp plate, and the second surface faces the diffusion layer, and
    a first refracting structure distributed on the first surface;
    wherein the first refracting structure comprises:
    a first arc surface extending from the first surface to a direction of the diffusion layer and the groove; and
    a first vertical surface connecting the first arc surface to the first surface.

2. The display panel of claim 1, wherein a height of the first vertical surface is defined as H, and a length of a projection line of the first arc surface on the first surface is defined as I, and wherein a ratio of H to I is in a range of 0.01 to 0.15.

3. The display panel of claim 1, wherein the light controlling layer comprises:
    a second refracting structure distributed on the second surface.

4. The display panel of claim 3, wherein the second refracting structure comprises:
    a second arc surface extending from the second surface to a direction of the LED lamp plate and the groove, and
    a second vertical surface connecting the second arc surface to the second surface.

5. The display panel of claim 4, wherein a space between adjacent first vertical surfaces is less than a space between adjacent second vertical surfaces.

6. The display panel of claim 1, wherein a material of the liquid crystal structural layer comprises polymers and small molecular liquid crystals.

7. The display panel of claim 1, wherein a diameter of the groove is in a range of 2 mm to 5 mm.

8. A display device comprising the display panel of claim 1.

9. The display device of claim 8, wherein a height of the first vertical surface is defined as H, and a length of a projection line of the first arc surface on the first surface is defined as I, and wherein a ratio of H to I is in a range of 0.01 to 0.15.

10. The display device of claim 8, wherein the light controlling layer comprises:
    a second refracting structure distributed on the second surface.

11. The display device of claim 10, wherein the second refracting structure comprises:
    a second arc surface extending from the second surface to a direction of the LED lamp plate and the groove, and
    a second vertical surface connecting the second arc surface to the second surface.

12. The display device of claim 11, wherein a space between adjacent first vertical surfaces is less than a space between adjacent second vertical surfaces.

13. The display device of claim 8, wherein a material of the liquid crystal structural layer comprises polymers and small molecular liquid crystals.

14. The display device of claim 8, wherein a diameter of the groove is in a range of 2 mm to 5 mm.

* * * * *